Sept. 20, 1955  A. BARTLETT  2,718,074
SCOOP ATTACHMENT FOR TRACTORS
Filed May 4, 1953  2 Sheets-Sheet 1
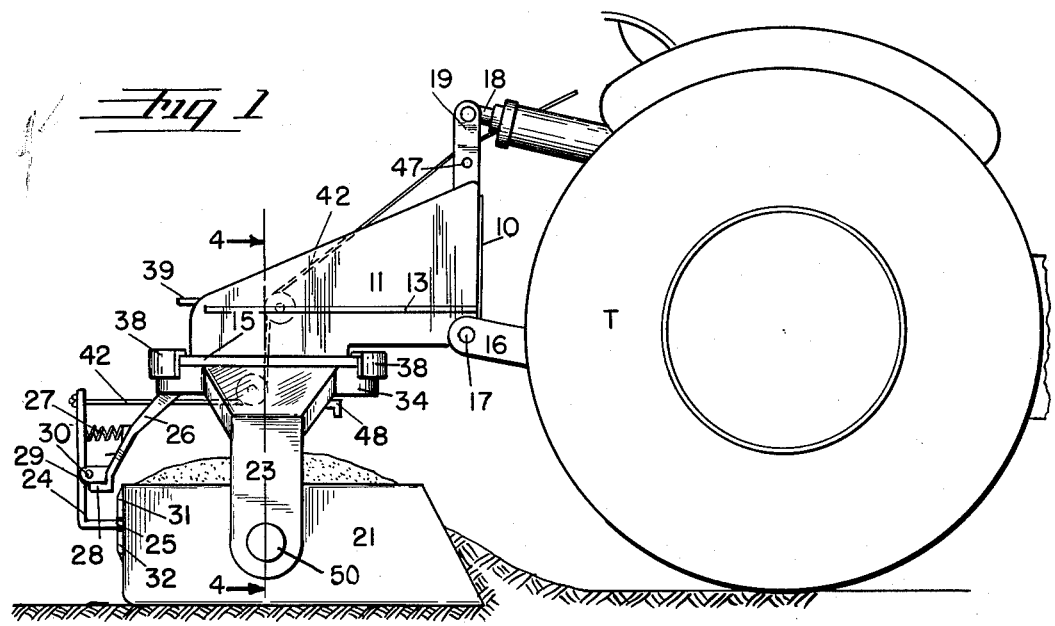
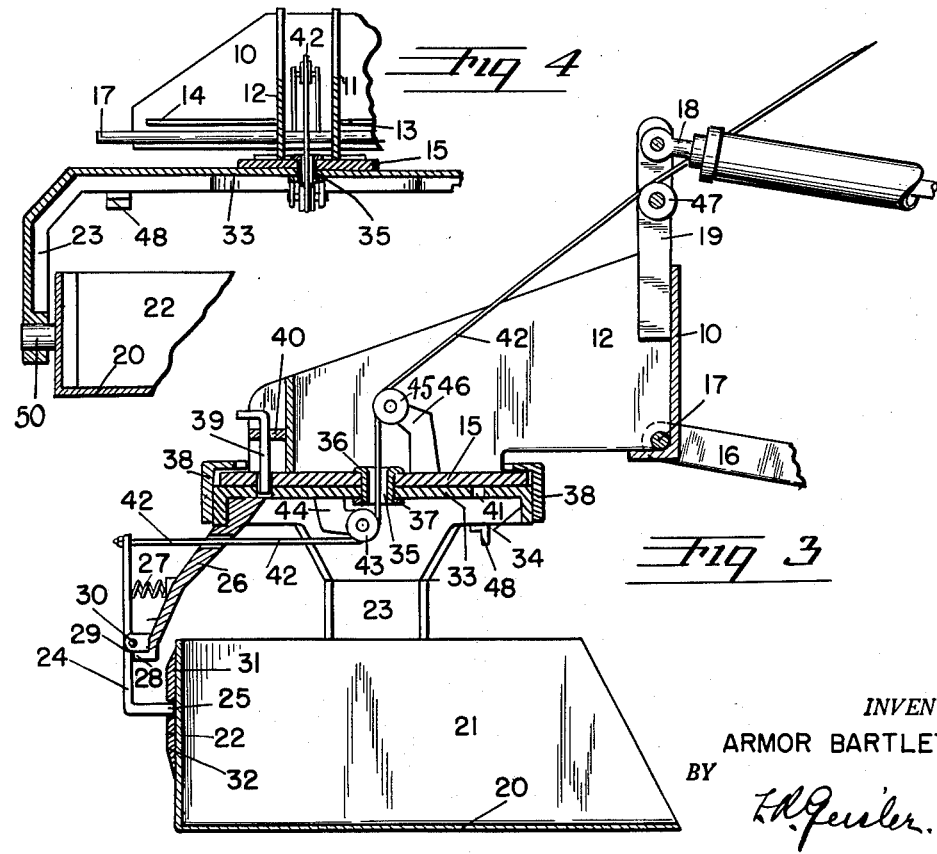
INVENTOR.
ARMOR BARTLETT
BY
ATTORNEY Sept. 20, 1955  A. BARTLETT  2,718,074
SCOOP ATTACHMENT FOR TRACTORS
Filed May 4, 1953  2 Sheets-Sheet 2

INVENTOR.
ARMOR BARTLETT
BY
ATTORNEY

United States Patent Office 2,718,074
Patented Sept. 20, 1955

2,718,074

SCOOP ATTACHMENT FOR TRACTORS

Armor Bartlett, Vancouver, Wash.

Application May 4, 1953, Serial No. 352,671

3 Claims. (Cl. 37—124)

This application is a continuation-in-part of my pending application Serial No. 334,945, filed under date of February 3, 1953, and entitled "Ajustable Scoop Assembly for Tractors"; and the invention covered by this application, like that described in the former application, relates to a ground-working scoop shovel adapted to be attached to and operated by and in conjunction with a conventional tractor.

An object of the present invention is to provide a special scoop attachment which can be operated either by being pulled by the tractor into engagement with the earth or other material to be moved by the scoop, and thus with the tractor manipulated in a forward direction, or by being pushed by the tractor into engagement with the material upon the backing of the tractor.

Another and particular object of this invention is to provide a novel and simplified scoop releasing means which can be controlled by the operator on the tractor enabling the scoop to discharge or dump the material in the scoop when the scoop has been raised.

An additional object of the invention is to provide a scoop which will be so mounted and controlled that the scoop can also be used as a leveler or scraper at the option of the operator on the tractor when the scoop releasing means has been actuated.

The construction of my improved scoop attachment, its manner of operation and in particular the scoop releasing means will be briefly described with reference to the accompanying drawings, in which:

Fig. 1 is a side elevation showing the scoop attachment in the lowered position behind the tractor and scooping up earth as it is pulled forwardly by the tractor;

Fig. 3 is a sectional elevation of the scoop and its supporting frame, drawn to a slightly larger scale, the section being taken through the longitudinal center of the scoop and frame;

Fig. 4 is a fragmentary transverse vertical section corresponding in part to line 4—4 of Fig. 1.

Figure 2:
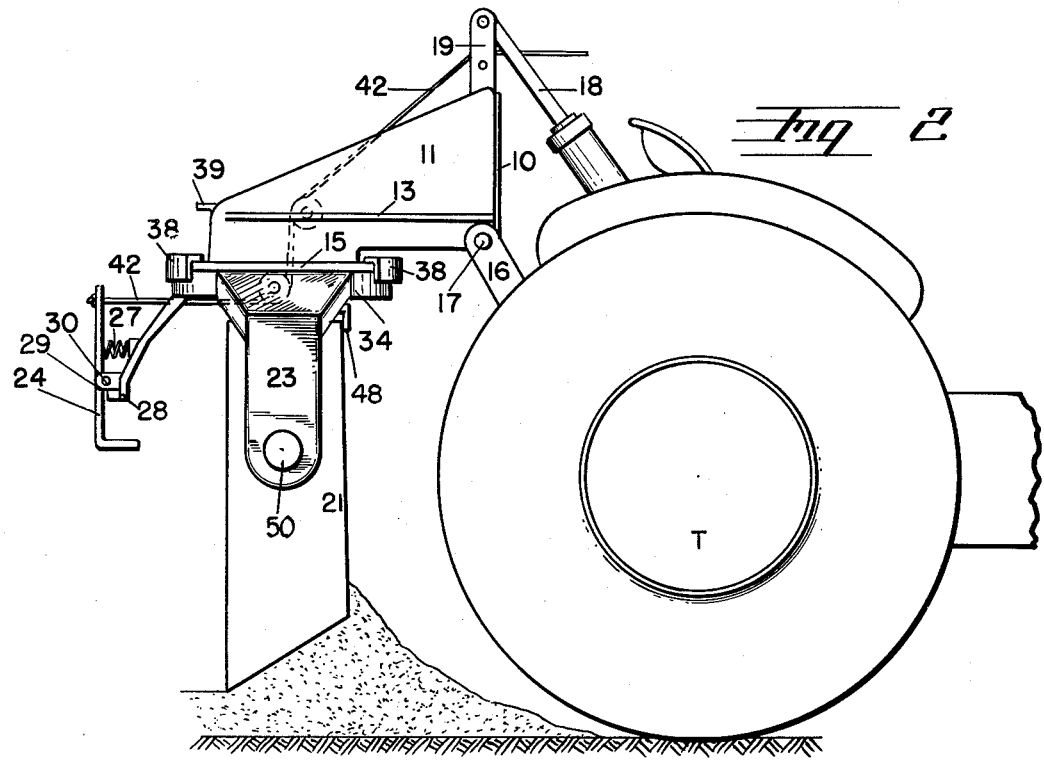
Fig. 2 is a corresponding side elevation showing the scoop and its supporting frame lifted to raised position on the tractor and the scoop itself then released and allowed to swing downwardly into dumping position and also into scraping or leveling position.

A triangularly-shaped upper frame structure, below which the scoop attachment is mounted, includes a transversely-extending front plate 10, a pair of parallel vertical, rearwardly-extending center plates 11 and 12, spaced a short distance apart and welded to the front plate 10, a pair of side braces 13, 14 connecting the center plates 11 and 12 respectively with the front plate 10, and a base plate 15 carried by the center plates 11 and 12.

This upper frame structure is arranged for mounting on the rear of an ordinary tractor T by the customary three-point connection. A pair of lift arms 16, 16 on opposite sides of the tractor have their rear ends pivotally connected to a transverse shaft 17 secured to the front plate 10. An adjustable top-positioning member 18 on the tractor has its outer end pivoted on a stub shaft extending between two upstanding bars 19, 19 attached to and extending upwardly from the forward ends of the center plates 11 and 12. Thus the entire upper frame structure can be raised or lowered, or its position otherwise adjusted from the tractor in the usual manner.

The scoop or scoop shovel comprising a bottom 20, side walls 21, 21 and a back wall 22, is pivotally supported between the downwardly-extending arms 23, 23 of an inverted U-shaped scoop-mounting frame. The pivotal connections 50, 50 between the arms 23, 23 and the side walls 21, 21 of the scoop are so located that the scoop will be off balance, and, when the scoop is free to tilt in these pivotal mountings, the open forward end of the scoop will swing downwardly as illustrated in Fig. 2.

In order to hold the scoop against such downward swing a spring-actuated latch 24 engages a horizontal slot between a pair of plates 31 and 32 which are attached on the outside of the back wall 22 of the scoop. The latch 24 is L-shaped having a bottom portion 25 adapted to engage the slot between the plates 31 and 32. The latch is secured on a pin 30 which is pivotally mounted in a pair of ears 29 carried on a bracket arm 26. The bracket arm 26 depends from and is rigidly secured to the top of the scoop-supporting frame. A spring 27 (Fig. 3) held under compression between the bracket arm 26 and the latch 24, the ends of the spring passing around lugs on the bracket arm 26 and latch 24 respectively, holds the latch normally in locking engagement with the scoop. The lower end 28 of the bracket arm 26 is bent outwardly and limits the swing of the latch 24 under the force of the spring 27 when the scoop is out of the range of the latch.

The arms 23 of the scoop-mounting frame are joined to an enlarged top portion 33 (Fig. 3), which portion is reinforced with downwardly-extending flanges 34 along its edges. The width of this top portion 33 at its center is approximately equal to the length of the base plate 15 of the upper frame structure, and the ends of the base plate 15 and the central registering edges of the top scoop frame portion 33 are formed into similar arcs with the center of curvature located at a point corresponding to the center of the plate 15 and the center of the frame portion 33. An aperture is located at this center in the plate 15 and the portion 33 has a registering aperture, and a tubular bearing sleeve 35 is loosely mounted in these registering apertures. The bearing sleeve 35 is formed with an annular flange 36 at the top to keep the sleeve from dropping down out of place, and the bottom end of the sleeve is externally threaded and carries a retaining ring 37 so as to prevent inadvertent displacement of the sleeve.

A pair of curved retainers 38, having inwardly-extending top flanges, are secured on the curved edges of the top portion 33 of the scoop-mounting frame and extend above and over the corresponding curved ends of the plate 15, as shown most clearly in Fig. 3. The purpose of these retainers, as evident, is to cause the scoop assembly to be supported from the plate 15 and from the upper frame structure, and also to permit the scoop assembly to be rotated with respect to the plate 15 and upper frame structure. The shape of the plate 15, inasmuch as the plate 15 is not entirely circular, the arrangement of the curved retainers 38, and the removable bearing sleeve 35 make it possible for the entire scoop assembly to be removed from the upper frame structure should it be desired to do so.

A locking pin 39 (Fig. 3) is mounted in an eye 40 secured between the rear ends of the upright center plates 11 and 12 and this locking pin extends down through a hole in the plate 15. The top portion 33 of the scoop-mounting frame is provided with a pair of holes 41, each of which is capable of being brought into registration with the locking pin 39 and which holes 41 are 180° apart. Thus the scoop assembly may be locked to the upper frame structure either in the position illustrated in Figs. 1 and 3 or in the reversed position illustrated in Fig. 5, depending upon whether the scoop is to be pulled forwardly or pushed rearwardly by the tractor in the ground-working operation.

A cord-like element or wire 42, which may be in the form of a rope, single wire, light woven cable or thin chain, has one end attached near the top of the latch 24. This wire 42 passes under a pulley 43 (Fig. 3) mounted on a bracket 44 secured to the underside of the top portion 33 of the scoop-mounting frame. This pulley 43 is so positioned that the axial line of the bearing sleeve 35 will be tangential to the pulley 43 as shown. The wire 42, after passing under the pulley 43 and passing upwardly through the bearing sleeve 35, passes over a second pulley 45 mounted on a bracket 46 secured on the plate 15. This second pulley 45 like the pulley 43, is so positioned that the axial line of the bearing sleeve will also be tangential to the pulley 45. The axis of the pulley 45 is substantially parallel to the front plate 10 of the upper frame structure as well as being parallel to the plate 15.

From the second pulley 45 the wire 42 passes upwardly and forwardly over a third pulley 47 mounted between the upstanding bars 19, 19 of the upper frame structure. The wire 42 finally terminates on the tractor at a location conveniently near the operator of the tractor so that it can be manually grasped by the operator.

As will be readily understood from Fig. 3, a manual pull on the wire 42 by the operator of the tractor will release the locking latch 24 from locking engagement with the scoop. Thus when the upper frame structure, and with it the scoop-mounting frame and scoop, are lifted to raised position by the lift arms of the tractor, the operator, by exerting a short pull on the wire 42 releasing the latch 24, will cause the unbalanced scoop to swing downwardly to the discharging position illustrated in Fig. 2.

When the scoop is allowed to swing downwardly it can also be used for leveling the dumped material on the ground or used as a ground scraper. A pair of limit lugs 48 are secured below the top of the scoop-mounting frame in order to prevent the scoop from swinging beyond the substantially vertical position illustrated in Fig. 2. When the scoop is in this position the scoop therefore can be used as a scraper with the forward movement of the tractor. Similarly, when the scoop-mounting frame has been rotated through 180°, the scoop, in downwardly swung or discharging position, can also be used as a leveler or scraper with the backing movement of the tractor.

When the scoop is again to be set back into horizontal or loading position this is either done manually by the operator, or it can be done by the operator without leaving his position on the tractor by having the tractor move slightly in the reverse direction from which it had been working and at the same time lowering the upper triangular frame. Thus, if the scoop is in the position shown in Figure 2, the scoop can be brought to horizontal or loading position by backing the tractor slightly and lowering the upper triangular frame until the bottom of the scoop rests on the ground and the latch 24 again engages the slot between the plates 31 and 32.

Figure 5:
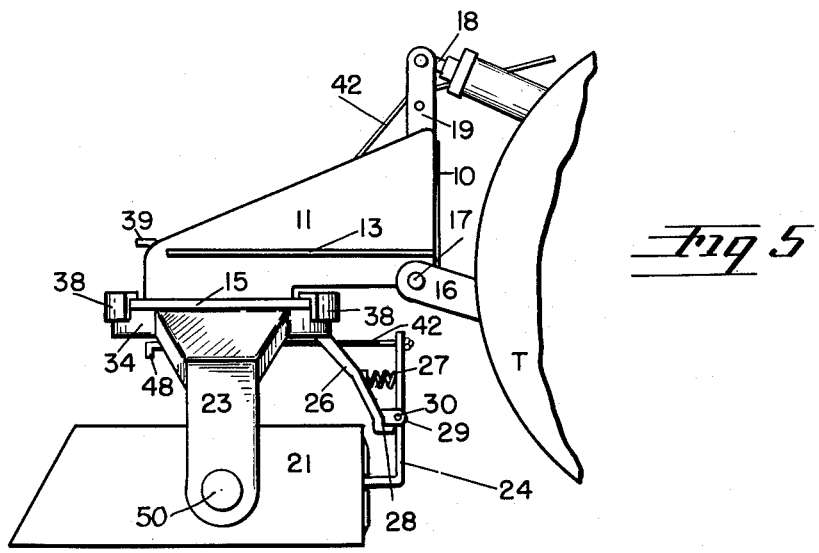
Fig. 5 is a side elevation of the scoop and supporting frame of Fig. 1 but showing the scoop rotated through 180° and thus in position to be operated by being pushed into contact with earth or other material with the backing of the tractor.

The reversing of the position of the scoop, thus from the position of Figs. 1 and 3 to the position of Fig. 5, will not interfere with the unlocking of the latch through the medium of the wire 42. Thus the operator of the tractor can cause the raised scoop to discharge its load (and also to be used for leveling or ground scraping) merely by pulling the wire 42, regardless of whether the scoop assembly has been adjusted to operate by the forward pull of the tractor or by the rearward push of the tractor.

I claim:

1. In an attachment of the character described for a tractor, an upper frame structure mounted on the tractor, a scoop assembly supported from said upper frame structure, a scoop carried in said scoop assembly, said scoop assembly rotatable on a substantially vertical axis, means on said upper frame structure for securing said scoop assembly in a desired rotated position with respect to said upper frame structure, whereby a ground-working operation can be performed by said scoop with said tractor moving either forwardly or rearwardly as desired, a hinge mounting for said scoop in said scoop assembly whereby said scoop may swing downwardly into discharging position from substantially horizontal load-carrying position, locking means in said scoop assembly normally engaging said scoop and holding said scoop from swinging into said downward discharging position, means carried in part by said scoop assembly and in part by said upper frame structure for releasing said locking means, a pull line included in said releasing means, a passageway leading upwardly from the top of said scoop assembly and through the bottom portion of said upper frame structure and located on the axis of rotation of said scoop assembly with respect to said upper frame structure, said pull line extending up through said passageway and thence to said tractor, whereby the operator on said tractor can actuate said releasing means regardless of the rotated position of said scoop assembly.

2. In an attachment of the character described for a tractor, an upper frame structure adapted to be mounted on the tractor, a base plate in said upper frame structure, a scoop-mounting frame attached to said base plate, a scoop carried by said scoop-mounting frame, said scoop-mounting frame rotatable on a substantially vertical axis with respect to said base plate of said upper frame structure, means on said upper frame structure for securing said scoop-mounting frame in desired rotated position, whereby a ground-working operation can be performed by said scoop with said tractor moving either forwardly or rearwardly as desired, a hinge mounting for said scoop in said scoop-mounting frame whereby said scoop may swing downwardly into discharging position from substantially horizontal load-carrying position, limit stops in said scoop-mounting frame limiting the downward swing of said scoop to enable said scoop to function as a scraper when swung into downward position, locking means on said scoop-mounting frame normally engaging said scoop and holding said scoop from swinging into said downward discharging position, means carried in part by said scoop-mounting frame and in part by said upper frame structure for releasing said locking means, a pull line included in said releasing means, a passageway leading upwardly from the top of said scoop-mounting frame and through said base plate on said upper frame structure and located on the axis of rotation of said scoop-mounting frame with respect to said upper frame structure, said pull line extending up through said passageway and thence to said tractor, whereby the operator on said tractor can release said locking means regardless of the rotated position of said scoop-mounting frame.

3. A scoop attachment of the character described for a tractor including an upper frame structure mounted on a tractor by a three-point connection with said tractor, a scoop-mounting frame supported from said upper frame structure, a scoop carried by said scoop-mounting frame, said scoop-mounting frame rotatable on a substantially vertical axis with respect to said upper frame structure, means on said upper frame structure for holding said scoop-mounting frame in desired rotated position, whereby a ground-working operation can be performed by said scoop with said tractor moving either forwardly or rearwardly as desired, a hinge mounting for said scoop in said scoop-mounting frame whereby said scoop may swing downwardly into discharging position from substantially horizontal load-carrying position, a spring operated latch attached to said scoop-mounting frame normally engaging said scoop and holding said scoop from swinging into said downward discharging position, a pull line attached to said latch, a passageway leading upwardly from the top of said scoop-mounting frame and through the bottom portion of said upper frame structure and located on the axis of rotation of said scoop-mounting frame with respect to said upper frame structure, said pull line extending up through said passageway and thence to said tractor, whereby the operator on said tractor can release said latch regardless of the rotated position of said scoop-mounting frame.

No references cited.